United States Patent [19]

Jones et al.

[11] Patent Number: 5,239,462
[45] Date of Patent: Aug. 24, 1993

[54] METHOD AND APPARATUS FOR AUTOMATICALLY DETERMINING THE APPROVAL STATUS OF A POTENTIAL BORROWER

[75] Inventors: Robert M. Jones, Houston, Tex.; Charles F. Goetz, Marietta; Larry L. Steele, Tucker, both of Ga.

[73] Assignee: Creative Solutions Groups, Inc., Atlanta, Ga.

[21] Appl. No.: 841,397

[22] Filed: Feb. 25, 1992

[51] Int. Cl.$^5$ ............................................. G06F 15/20
[52] U.S. Cl. ..................................... 364/408; 364/401
[58] Field of Search ........................ 364/401, 406, 408

[56] References Cited

U.S. PATENT DOCUMENTS

| 4,642,768 | 2/1987 | Roberts | 364/408 |
| 4,722,055 | 1/1988 | Roberts | 364/408 |
| 4,736,294 | 4/1988 | Gill et al. | 364/408 |
| 4,752,877 | 6/1988 | Roberts et al. | 364/408 |

OTHER PUBLICATIONS

Defendorf, "Loan Officers now Producing Credit Reports", (Data Fax Information Services, Company Profile), Apr. 20, 1987, pp. 1-3 (attached).
Carollo et al., "Bank One Expedites Loan Application Processing with Fax Server", Business Wire, (San Francisco), Feb. 3, 1992, pp. 5-6 (attached).

*Primary Examiner*—Roy N. Envall, Jr.
*Assistant Examiner*—Jennifer L. Hazard
*Attorney, Agent, or Firm*—Needle & Rosenberg

[57] ABSTRACT

A method and apparatus are provided for the real-time automatic determination of the approval status of a potential borrower of a loan. The method includes (1) transmitting an image of a form by facsimile transmission to a control location, wherein the form contains predefined information applicable to the potential borrower in spaces located at predetermined locations; (2) automatically receiving the image of the form by facsimile transmission at the control location; (3) automatically scanning and interpreting the image of the form to obtain the predefined information; (4) automatically determining at the control location the approval status of the potential borrower according to criteria provided by a lender, wherein the determining step utilizes the predefined information; and (6) automatically transmitting information regarding the approval status from the control location to the potential borrower. The invention further provides for a method and apparatus for scanning and interpreting a coded form received by facsimile transmission such that the form comprises a sheet having a predetermined number of timing marks spaced at predetermined intervals along the right hand and left hand vertical borders of the sheet such that each timing mark along the left hand border is paired with one timing mark along the right hand border. This method includes (1) automatically scanning the form to ascertain the presence and location of the predetermined number of timing marks; (2) automatically locating the vertical center of each timing mark; (3) automatically locating a line between the vertical center of each left hand timing mark to the vertical center of the respective paired right hand timing mark; (4) automatically detecting the spaces in predetermined locations along each line; and (5) automatically obtaining the predefined information applicable to the potential borrower from the spaces.

16 Claims, 2 Drawing Sheets

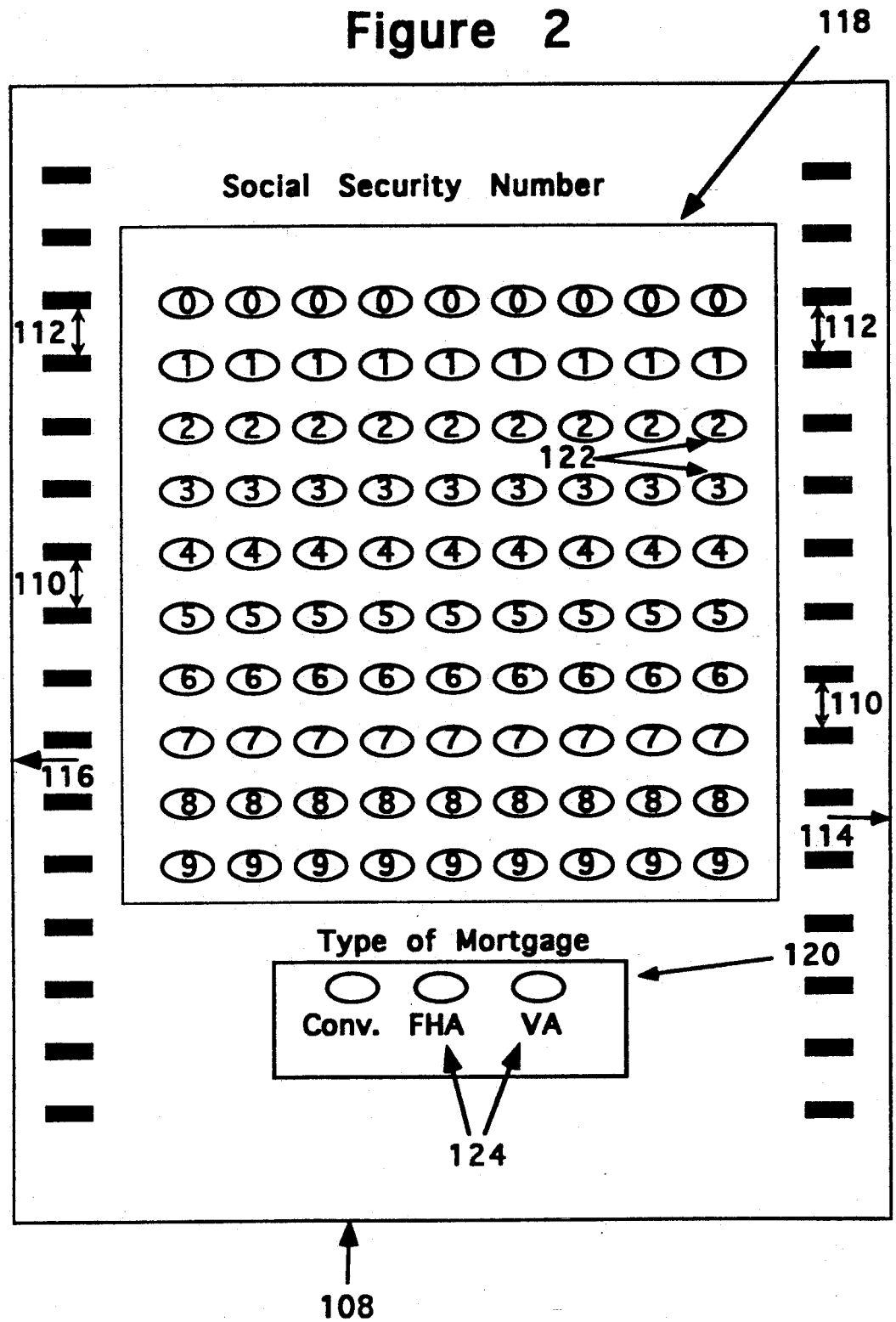

METHOD AND APPARATUS FOR AUTOMATICALLY DETERMINING THE APPROVAL STATUS OF A POTENTIAL BORROWER

BACKGROUND OF THE INVENTION

The present invention relates to methods and apparatus for automatically determining the approval status of a potential borrower with respect to a loan, particularly a mortgage loan. In particular, the present invention relates to a computer-automated method and system for determining the approval status of a potential borrower in which a borrower sends a form containing predefined information relating to the potential borrower by facsimile transmission from a remote location to a control location and receives a real-time response automatically from the lender regarding the approval status.

Generally, determination of the approval status of a potential borrower for a loan has been accomplished either by conventional manual processes or by using a computer-based system. Using the context of home mortgage lending to illustrate these processes, the potential borrower first selects the home he/she is interested in. The manual determination processes typically require that the potential borrower fill out a lengthy mortgage application form, submit this form to the lender or mortgage originator and wait several days for the application to be processed by the lender or mortgage originator. During this processing period, assembling and processing of the information required to make a lending decision are carried out manually. These tasks typically include: (1) calling a credit bureau to pull a credit report; (2) scoring the credit worthiness of the applicant, in most cases manually, and making a subjective judgement; and (3) determining whether the requested amount of the mortgage falls within the bounds of a maximum multiplier of the potential borrower's income. Generally, at this point, the potential borrower would be notified if there were any problems concerning approval of a loan and, thus, could infer if he/she had a good or bad chance of ultimately securing a mortgage from the lender.

However, these methods are less than satisfactory because of inefficiencies and confidentiality problems. That is, the process of determining if the potential borrower can obtain a mortgage is not completed until after considerable time is spent selecting and negotiating for a house; if the potential borrower is denied the loan, the time spent selecting and negotiating for the house is wasted. Further, the process of determining if the potential borrower can obtain a mortgage typically takes at least two to five days, which may limit the potential borrower's options. In addition, this process involves disclosure of sensitive information to several people, including the mortgage originator and, usually, the real estate agent.

Computer-based systems have been developed that require the potential borrower or real estate agent to input information relating to the potential borrower's ability to acquire a loan, such as his/her social security number, income and expenses, directly into a computer. The computer then performs a credit scoring and credit checking analysis to determine whether the potential borrower is eligible for a loan.

However, because many individuals are intimidated by computers, these computer-based services frequently are not used. Further, use of computer-based systems generally requires training someone, such as the real estate agent, how to use the system, which requires a significant investment in time and resources. In addition, as with the manual processes, sensitive information is usually required to be shared with another, such as the real estate agent, to input the information; perspective buyers may shy away from providing this information to another or may provide incorrect information depending upon the buyer's relationship with the real estate agent.

Thus, there exists a need for a method and apparatus for automatically providing a fast response to a potential borrower's inquiry regarding his/her approval status for a loan that does not require the potential borrower, or another person, to input sensitive data related to the potential borrower's ability to obtain a loan into a computer. Because this need can be met by a process in which the potential borrower completes and sends by facsimile transmission a form that contains information relating to his/her ability to obtain a loan to the lender or agent of the lender, there also exists the need for a method, and associated apparatus, for automatically scanning and interpreting the facsimile transmission copy of a form coded to contain predefined information.

Generally, methods for automatically scanning and interpreting information located on a form that has been received by facsimile transmission, such as those routines currently available for scanning or optical character recognition routines, are limited by their lack of accuracy and/or by the necessity for inputing information onto the form using characters that conform to a particular size and style, such as those produced electronically or by a typewriter. However, these methods are not suitable because accuracy is vital to a lender's decision regarding approval status and because it is desirable for the potential borrower to enter sensitive information regarding his/her ability to obtain a loan directly onto the form, such as by hand.

Thus, there exists a need for an improved method, and associated apparatus, for automatically scanning and interpreting a coded form in which distortions of the image caused by facsimile transmission do not prevent accurate automatic translation, particularly if information on the form has been entered by hand.

SUMMARY OF THE INVENTION

In accordance with one aspect of the instant invention, a method and associated apparatus is provided for determining the approval status of a potential borrower, including whether the potential borrower is pre-approved or prequalified for a loan, in which unnecessary disclosure of sensitive information to persons, such as real estate agents, regarding a potential borrower's ability to obtain a loan is not required. Furthermore, because the acquisition and interpretation of credit information, preferably including information from a credit bureau, and the approval status determination steps are controlled by a computer, the instant invention provides for a real-time response to the potential borrower regarding his/her approval status, preferably within approximately 30 minutes, more preferably within 10 minutes, still more preferably within 5 minutes, most preferably within 3 minutes. This method includes the steps of (1) transmitting by facsimile transmission an image of a form that includes predefined information applicable to the potential borrower coded in spaces at predetermined locations to a control location; (2) automatically receiving the image of the form by facsimile transmission at the control location; (3) automatically scanning and interpreting the image of the form to decode the predefined information applicable to the potential borrower; (4) automatically determining the approval status of the potential borrower according to criteria provided by a lender, including utilizing the predefined information in this determination; and (5) automatically transmitting information regarding the approval status back to the potential borrower. Additionally, prior to determining the approval status of the potential borrower, the method may include (6) automatically transmitting information identifying the potential borrower to a data processing system maintained by a credit bureau; (7) automatically selecting financial information regarding the potential borrower from the data stored by the credit bureau and transmitting it to the control location; and (8) automatically utilizing this information obtained from the credit bureau in determining the approval status of the potential borrower.

Preferred embodiments include automatically transmitting information regarding the approval status of the potential borrower to the lender, automatically notifying various lead organizations, such as insurance companies, that the potential borrower is considering obtaining a loan to purchase an item, and providing information regarding the lender's current interest rates to a remote location such as the office of the real estate agent.

Because the instant invention requires the automatic accurate retrieval of information from the facsimile transmission copy of a form, which may be distorted during the facsimile transmission process, the instant invention also provides a method and associated apparatus for automatically scanning and interpreting a coded form received by facsimile transmission. In particular, the original form, such as a rectangular or square sheet, which is coded, such as by hand by the potential borrower, to contain the predefined information within spaces located at predetermined locations on the form, comprises a sheet having a predetermined number of timing marks, such as small blackened rectangles squares, circles or ovals, spaced at predetermined intervals along the right-hand and left-hand vertical borders of the sheet such that each timing mark along the left-hand border is paired with a timing mark along the right hand border. The method includes (1) automatically scanning the copy of the form to ascertain the presence, location and number of the timing marks; (2) automatically locating a line between each left hand timing mark to the respective paired right hand timing mark; (3) automatically locating the predetermined spaces along each line on the form; and (4) automatically obtaining the predefined information contained within the spaces.

Thus, it is an object of this invention to provide a facsimile transmission-based method and apparatus for automatically providing the real-time automatic determination of the approval status of a potential borrower, including pre-approval and prequalification for a loan. In particular, it is an object of this invention to provide for immediate determination of the maximum amount of a loan with respect to buying a particular article that the potential borrower can afford and, if appropriate, pre-approve or prequalify the potential buyer for this loan. Thus, time wasted looking at inappropriately priced items, such as a house, can be minimized. In addition, this invention does not require the potential borrower, or other persons such as a real estate agent, to directly interface with a computer, thus minimizing non-use of the invention caused by hesitancy to use a computer. Similarly, because the end user only fills out a form and sends the form by facsimile transmission, this invention does not require significant training of end users in order for the system to be implemented.

A further object of this invention is to minimize the disclosure of sensitive information relating to the potential borrower's ability to obtain a loan. Because the potential borrower can input information directly into the form and send this form by facsimile transmission, such as in the office of a real estate agent, no sharing of sensitive information with others, such as a real estate agent, need occur.

It is a still further object of the instant invention to decrease the amount of time needed to close the loan or mortgage. Because most of the information needed to originate a loan is already gathered and analyzed by the instant method for real-time determination of the approval status of a potential borrower, such as pre-approval or prequalification for a loan, less additional time is necessary to close the loan.

It is an additional object of this invention to provide a method and apparatus for automatically and accurately decoding a form that has been sent by facsimile transmission. Because distortion of the form can occur during the facsimile transmission process, this invention provides for a method and apparatus capable of recognizing and compensating for this distortion to enable accurate automatic retrieval of information contained on the form.

DESCRIPTION OF THE FIGURES

FIG. 2 shows an embodiment of the form in accordance with the invention.

DETAILED DESCRIPTION OF THE INVENTION

Figure 1:
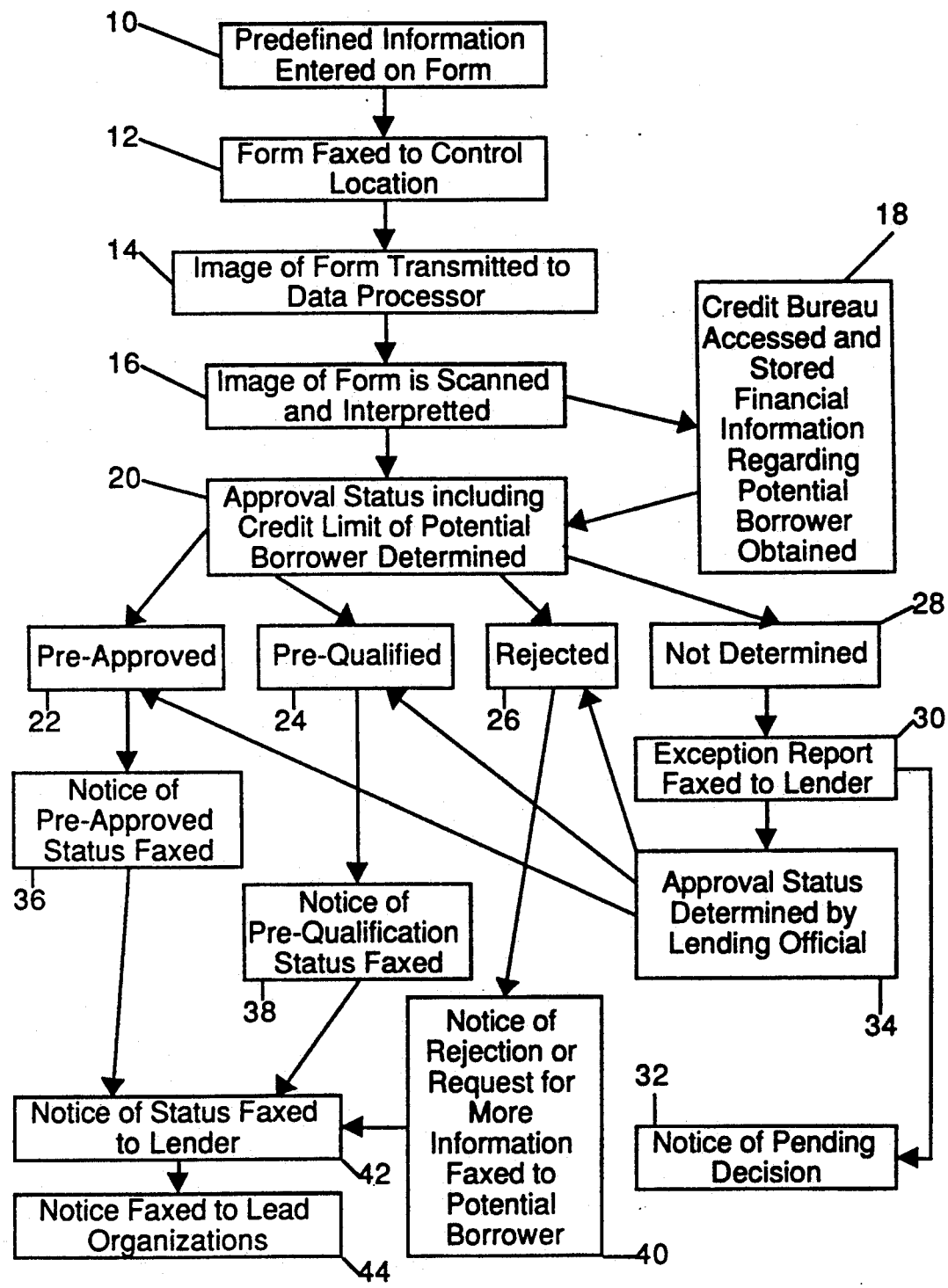
FIG. 1 is a flow chart depicting an embodiment of the data processing methodology and structure for the real-time automatic determination of the approval status of a potential borrower for a loan in accordance with the invention.

As used herein, the term "approval status" refers to the status that would be assigned by a lender to a potential borrower of a loan if the borrower were requesting a loan for a specific amount. This status can be upgraded or lowered depending, for example, upon the completion by the borrower of the lender's remaining requirements, changed conditions that would affect the potential borrower's ability to repay the loan and changed market conditions. Various degrees of approval are contemplated in the term "approval status" including "prequalified," which generally means that the borrower meets the qualifications for obtaining a loan for a specific amount so long as certain information is verified, the borrower satisfactorily resolves issues regarding the borrower's credit history and/or other conditions are met; "pre-approved", which generally means that the borrower, except for verification of certain information, is approved for a loan of a specified amount; "rejected", which generally means that the borrower does not meet the lender's qualifications for obtaining the loan; and "undetermined," which generally means that a status based upon a substantive evaluation of the information relating to the potential borrower's ability to obtain a load could not be determined because, for example, the potential borrower did not fill out the form completely, an error in transmission occurred or the programmed data processor was unable to determine if the approval status of the borrower is "prequalified", "preapproved", or "rejected". Typically, a borrower's status advances from prequalified to pre-approved to final approval and closing of the loan.

As used herein, the term "real-time" is meant to characterized the instant method as one in which, following facsimile transmission of the form by the potential borrower, each subsequent step automatically follows of the previous step without delay, thus allowing the potential borrower to receive a prompt response regarding his/her approval status. Typically, the interval between the time the potential borrower sends the form to the control location to the time he/she receives a response generated by this method is less than 30 minutes, preferably less than 10 minutes, more preferably less than 5 minutes, most preferably less than 3 minutes.

The system for the real-time automatic determination of the approval status of a potential borrower for a loan, such as a real estate mortgage loan, a refinancing loan, an automobile loan, a personal revolving debt or a general loan, comprises a central computer located at a control location connected to at least one facsimile receiving and transmission unit, which can be accessed by a network of facsimile transmission and receiving units located at remote point-of-sale stations. These remote point-of-sale stations are areas that are accessible to a potential borrower, whether they are physically close to the control location, such as in the same building as the central computer (e.g., both the control location and a point-of-sale station located within the same bank building), or physically distant from the control location (e.g., point-of-sale station located in the office of a real estate agent or car salesman; control location in a physically separate building). The point-of-sale stations serve as the data entry points for a potential borrower's inquiry regarding his/her approval status and as locations to which the system's reply to this inquiry can be sent. Further, these point-of-sale stations serve as points through which salespersons can refer to and retrieve data, such as the current interest rates of a lender, to answer a customer's questions concerning a potential loan.

In detailed overview, the method and associated system of the instant invention operates as follows. Referring to FIG. 1, the actions described in blocks 10 and 12 occur at the point-of-sale stations. At block 10, the potential borrower, or a person authorized by the potential borrower, enters the predefined information relating to the borrower's ability to obtain a loan (such as the borrower's social security number and annual income) for a particular product (such as real estate) into spaces located at predetermined locations on a form, such as by filling in spaces (e.g., squares, rectangles, circles or ovals) that correspond to a particular number or letter correlating to a particular piece of predefined information in predetermined locations and, at block 12, transmits the form by facsimile transmission from a point-of-sale station to the control location. At the control location, the data processing system of the instant invention allows for the transmission to be received automatically, such as by an Intel Fax Board (Intel Satisfaction Board, Intel Corp., Santa Clara, Calif.) and then, at block 14, transfer the image of the completed form automatically to a programmed data processor (programmed central computer), such as to a storage device (e.g., hard drive) connected to the computer, typically employing the software associated with the fax board, and then into extended memory, typically employing software such as PCX Toolkit (Genus Microprogramming, Houston, Tex.).

The programmed data processor, at block 16, then processes the information contained in the image by scanning and interpreting the image to determine the location of the spaces in the image that correspond to those in the original form so as to compensate for distortion caused by facsimile transmission of the form and to resolve and decode the predefined information located within the spaces in the image. The data processor also detects whether errors, such as incomplete facsimile transmission of the form or incomplete or incorrect entering of the predefined information onto the form has occurred, and sends appropriate information by facsimile transmission to the potential borrower at the point-of-sale station.

The programmed data processor preferably automatically accesses a credit bureau data processing system at block 18, using at least some predefined information decoded from the image, such as the potential borrower's social security number, to extract stored financial information regarding the potential borrower from the data file of stored financial information in the credit bureau data processing system (such as by directing a modem associated with the programmed data processor to call the credit bureau system and supplying or receiving any needed passwords and/or commands to or from the credit bureau system). This information is then automatically transmitted to the programmed data processor of the instant invention. For instance, the computer of the instant invention may, using the social security number of the potential borrower, call the credit bureau and interface appropriately with the software controlling the credit bureau data processing system to select the credit profile of the potential borrower and to interpret the information obtained from the credit bureau. Preferably, a piece of predefined information, such as the borrower's zip code, that is not used to access the credit bureau is obtained from the credit bureau so that the computer can verify that the correct credit profile is selected. Typically, the credit information obtained in this manner from the credit bureau includes a score relating to the credit worthiness of the potential borrower.

At block 20, the programmed data processor, using the predetermined information and, preferably, the selected stored financial information regarding the potential borrower obtained from the credit bureau, then determines the approval status of the potential borrower according to criteria provided by a lender, including the maximum amount of a loan available based upon criteria provided by the lender. For instance, the credit worthiness score obtained from the credit bureau may be compared to a table of score ranges obtained from the lender and located in a data file accessible to the programmed data processor to determine whether the borrower is pre-approved (block 22), prequalified (block 24) or rejected (block 26) and the maximum amount of a loan available to the potential borrower from the lender may be determined by using a predetermined formula which includes the potential borrower's net income.

If the programmed data processor is unable to determine whether the potential borrower is pre-approved, prequalified or rejected based upon the predetermined information and/or information from the credit bureau (block 28), the system, at block 30, automatically sends an exception report by facsimile transmission to the lender that includes the predetermined information and/or the selected stored financial information obtained from the credit bureau for further approval status determination by a lending official. The potential borrower is also notified at block 32 by facsimile transmission that the approval status decision is pending. The lending official may then determine the approval status manually (block 34) and send the approval status determination to the control location, such as by facsimile transmission, where it can be inputed either manually or, preferably, automatically (e.g., using the facsimile transmission scanning and interpretation routine described above) into the programmed data processor.

The programmed data processor then selects a particular notice of approval status form letter appropriate for the particular potential borrower from a data file accessible to the data processor and creates a notice letter with appropriate wording. For instance, the letter may be addressed to the potential borrower; identify the lender; describe the borrower's approval status, including the maximum loan amount available for differing payback times; describe what, if any, additional steps the borrower must undertake to gain approval of the loan; verify the information the potential borrower submitted on the form and/or request more information from the borrower.

The notice letter is then automatically sent to the potential borrower at a point-of-sale station (blocks 36, 38, and 40), typically by being placed in an outbound queue of a fax board, from which the fax board software automatically places the call to the point-of-sale station and transmits the letter by facsimile transmission. An additional copy of the approval status letter or a different version summarizing the information contained in the status letter is sent to the lender automatically at block 42 and, optionally, a notice regarding the potential borrower's interest in purchasing the product may be sent to appropriate lead organizations (block 44), such as real estate insurance companies. These procedures allow for immediate follow-up by the lender or lead organization with the potential borrower. Using an MS-DOS PC computer with at least 4 megabytes of RAM memory, for the usual case, it typically takes around 16 seconds to transmit the image of the form to the data processor (block 14), about 20 to scan and interpret the image (block 16), about 90 seconds to obtain credit bureau information (block 18), about 1 second to determine the approval status of the potential borrower (block 20) and about 60 seconds to transmit the notice of approval status to the potential borrower (blocks 36, 38, or 40), leading to an approximate overall time of 2 minutes and 47 seconds. Notifying the lender of the approval status of the borrower (block 42) typically takes an additional 60 seconds as does notifying a potential lead organization (block 44). Obviously, for a particular case, these times might be shorter, or, particularly if an exception report is required (block 30) or other difficulties are experienced, these times could be longer.

According to one embodiment of the instant invention, the programmed data processor automatically accesses a data file containing historical information relating to the facsimile transmission letters sent by the processor (e.g., blocks 36, 38, 40 and 42) to monitor, for instance, the transmission times, whether the transmissions were successful or whether the letters need to be re-sent or canceled. Further, the processor automatically accesses a data file containing information relating to appropriate address information, such as point-of-sale facsimile transmission destination and address information and lender's branch and field office facsimile transmission destination and address information, for inclusion in the various letters. Also, the processor may automatically access a data file containing phone numbers and passwords, which can be used to call the credit bureau data processing system.

Additionally, the data processing system of the instant invention may include global programming variables, which can be used, for instance, to identify or number each incoming and outgoing facsimile transmissions, to monitor time intervals between occurrence of specified events and to monitor the status of various hardware components to enable the system to operate efficiently and/or signal personnel at the control location to attend to a malfunctioning component.

The programmed data processor may allow for input of current daily interest rates of the lender into a data file for use in determining the approval status of the potential borrower or for dissemination to point-of-sale stations either automatically or upon request.

The data processor (central computer) of the invention may be any computer having, preferably, at least 4 megabytes of RAM memory, more preferably a standard MS-DOS PC. The modem employed may be any modem that is compatible with the central computer and the credit bureau data processing system and/or data processors at the point-of-sale stations, preferably a standard Hayes-compatible PC modem. The fax board employed can be any fax board that is compatible with the central computer, preferably an Intel Fax Board (Intel Corp., Santa Clara, Calif.).

The form of the instant invention comprises a sheet of any size, shape or composition that can be used in a facsimile transmission apparatus to transmit an image of the form. For instance, the composition of the sheet may be, e.g., plastic or paper, preferably paper; the shape may be, e.g., square, rectangular, triangular or circular, preferably rectangular; and the size may be any size that can be accommodated by the facsimile transmission apparatus.

The form includes spaces that are located at predetermined locations on the form such that each space is associated with information relating to a particular piece of predefined information. Preferably, these spaces comprise squares, rectangles, triangles, circles or ovals corresponding to a particular number, letter, or symbol of the predefined information that can be filled-in or left blank to code for the predefined information. Alternatively, the spaces can be areas in which the number, letter or symbol of the predefined information can be directly entered. Preferably, the spaces are located at preset positions along a line connecting a pair of left hand and right hand timing marks.

The predefined information is information relating to the potential borrower, such as the point-of-sale station from which the form is being sent, the salesperson associated with the potential borrower, the borrower's social security number, the zip code of his/her current address, annual household income, monthly debt payments, spouse's social security number, years at his/her current address, years at his/her last address, and years at his/her current job, the percent downpayment the borrower will make, the amount of funds available to the borrower to close the loan, the type of mortgage, the borrower's signature and the like.

The form is constructed so as to allow accurate scanning and interpretation of a facsimile transmitted image of the coded or filled-in form. In particular, the form contains timing marks located at different areas on the form so as to allow compensation of the amount of distortion of the form that occurred during the facsimile transmission process. Because the location of these marks with respect to the predetermined spaces containing the predefined information is known for the original form, the relative location of the predetermined spaces on the image can be accurately determined once the location of the marks on the image are discovered.

Thus, the timing marks on the form comprise any array of marks that are capable of being distinguished from the predetermined spaces, predefined information or stray marks appearing on the image of the form and whose relative positions on the form are known. These marks should be positioned so as to detect both horizontal and vertical distortion. Particularly useful timing marks comprise a predetermined number of marks, such as blackened squares, rectangles, ovals, circles and the like, located at predetermined intervals along the right hand and left hand vertical borders of a rectangular or square form. These marks are positioned so that the location of a particular left hand mark is known with respect to a least one right hand mark, such as being horizontally paired with the right hand mark or being paired in such a manner that the slope of a line connecting the respective left hand and right hand marks is known.

The timing marks preferably comprise from about 70 to about 100 rectangularly-shaped, blackened marks equally spaced apart along the right hand and left hand vertical borders of a sheet of paper (about 35 to about 50 timing marks/border), preferably a 8.5×11 inch sheet of paper, such that each left hand timing mark is horizontally paired with one right hand timing mark. These marks can be usefully located within an area of about ⅛ inch to about 1 inch from the vertical edges of the paper and from about 1/16 inch to about ⅛ inch high in the horizontal direction. Preferably, the timing marks are from about 110 to 140 pixels (dots in a facsimile transmission image) in width, most preferably about 128 pixels wide.

FIG. 2 depicts an example embodiment of the form according to this invention. Timing marks 110 are horizontally opposed and are located at equally spaced intervals 112 along the right hand 114 and left hand 16 vertical borders along the form 108. This example form contains two pieces of predefined information (118, 120) relating to the Social Security number of the borrower (118) and Type of Mortgage (120). Each space 122 associated with Social Security predefined information 118 and each space 124 associated with Type of Mortgage predefined information 120 is located along a horizontal line and at a set position relative to a pair of timing marks. Obviously, additional predefined information, text identifying the origination and purpose of the form, instructions to the borrower relating to the use of the form, a signature space for the borrower and/or the borrower's spouse authorizing the lender to obtain a credit report etc., may also be included on the form.

The image of the form of the instant invention may be automatically scanned and interpreted according to the following procedure, using, as an example, an 8.5×11 inch form with 44 timing marks located along each vertical border of the form as discussed above and having the predefined information coded into oval spaces located at predetermined locations situated at preset positions along at least some of the 44 lines connecting the 44 pairs of right hand and left hand timing marks. Each oval corresponds to a number, letter or symbol related to the predetermined information. An oval space blackened by the borrower or borrower's agent represents the presence of a particular number, letter or symbol while an unfilled oval represents the absence of the particular number, letter or symbol.

Following loading of the image of the coded form into the memory of the data processor, the left and right hand timing marks are located. First, a selected a specified raster line (horizontal row of pixels across the image) in the upper left hand side of the page is examined to see if there is a continuous row of dark (or set) pixels. If a row of a specified length corresponding to the length of the timing marks is found, a variable is set to indicate that this raster line is the starting raster line (vertical top) of a timing mark. To locate the vertical bottom of the timing mark, the program continues to scan down each raster line of the image until it locates a row of pixels that have not been set, which indicates that this raster line corresponds to white space on the image of the form. If the height of the timing mark is below a set threshold, the data processor does not count the area between the raster lines as a timing mark and, thus, does not miscount a stray mark as a timing mark. For example, it has been found that, for a timing mark having a width of about 128 pixels, scanning for a preferred specified length of about 36 pixels is sufficient to identify a raster line that may include part of the timing mark. Further, preferably scanning for the presence of about 9 continuous raster lines possessing set pixels of the specified length is sufficient to identify the presence and location of the timing mark.

The programmed data processor continues the examination of the raster lines down the left hand side of the image until 44 timing marks are found. If all 44 marks are not found, an error condition exists, such as incomplete facsimile transmission. Thus, the processor exits the scanning and interpretation routine and sends appropriate information by facsimile transmission to the point-of-sale station from which the form was sent.

The processor also checks the position of the beginning pixel of the raster lines that contain part of the timing mark to ascertain if the timing mark is shifting to the left or to the right as the raster lines are scanned down. If shifting is found, the processor automatically adjusts its left/right scanning to compensate for images that were received slanted.

Following location of all 44 left hand timing marks, the procedure is repeated for determination of the 44 right hand timing marks, starting with a specified point chosen in the upper right hand side of the page. If 44 timing marks are not found on the right hand side, an error condition exists and is processed as given above.

The processor then locates the vertical center of each timing mark by subtracting the ending raster line number from the beginning raster line number and dividing by 2. This procedure is repeated for all 44 left and right hand timing marks. The processor then retrieves the center raster line for each timing mark and calculates its width (continuous dark pixels), dividing its width by 2 to locate the center left to right of the timing mark.

The processor then locates the positions of ovals, which are of a set pixel length and at set positions relative to the timing marks, and determines whether the ovals have been filled in. First, the slope of the line (and thus the location of the line) between the centers of the left and right paired timing marks is calculated. For each oval position that is located along a particular line between paired timing marks (corresponding to an oval along a horizontal line in the original form), the processor examines, in addition to the center raster line, the 2nd raster line above the center and the 2nd raster line below the center in the area defined by the oval space. This procedure allows the identification of an oval as filled in if only the top part or only the bottom part has been darkened and thus compensates for incomplete filling of the ovals. The processor then counts the number of pixels that are dark within the oval along the specified raster line; if the number is above a threshold value, the oval is considered to be filled in.

This process is repeated for each oval position along the line between a paired set of timing marks. Each set of the 44 timing marks is examined to complete checking the form for filled in ovals. Using the information concerning which ovals were blackened in the image, the processor then converts this information to the numbers, letters or symbols that designate the predefined information. For example, a 10×9 array of ovals in which one oval in each column is darkened can be converted to a social security number. Predefined information corresponding to yes or no answers to specified questions can be decoded in this manner from a 2×1 array of ovals.

Once the processor has obtained all the coded predefined information in this manner, the processor may ascertain whether the location code from which the form was sent is valid and that all necessary information, such as, for example, the social security number, the zip code, the spouses social security number or debt amount, was encoded onto the form. If not, the processor signals an error condition or sends an appropriate request for information by facsimile transmission to the point-of-sale station from which the form was sent.

Additionally, if the form contains a signature line at a predetermined location, the processor may scan this location to determine if the form has been signed (i.e., scan and interpret this piece of predefined information). This step is important for uses in which the borrower's signature is required, such as authorization to obtain credit information from a credit bureau.

It is possible to write the software needed to implement the method and system of this invention in one of the available user languages, such as C. A set of instructions written in C (Microsoft 5.1) is given below that implements the procedures for scanning and interpreting the image of a form sent by facsimile transmission (block 16 of FIG. 1). In this listing, routines starting with "gx" or "pcx" are routines that can be obtained from the software package PCX Toolkit (Genus Microprogramming, Houston, Tex.). Also, some support routines, such as displaying a line on the screen, are also not explicitly written out. However, as would be appreciated by one skilled in the art, these routines (or usable variants of these routines) could be either written or obtained by one skilled in the art. Thus, in light of the description given above for the invention (including the remaining blocks in FIG. 1) and the listing below, a skilled programmer, with or without various available software packages, would be able to implement the method and system of this invention without undue experimentation.

Although the present process has been described with reference to specific details of certain embodiments thereof, it is not intended that such details should be regarded as limitations upon the scope of the invention except as and to the extent that they are included in the accompanying claims. Although the instant method and system is illustrated particularly in the context of obtaining a real estate loan, it will be apparent to those skilled in the art how the invention can be adapted, within the scope of the invention, to methods and systems for obtaining other types of loans or to other applications in which accurate translation of information located on a form that has been transmitted by facsimile transmission is desired.

```
/*---------------------------------------------------------------
 |   Decode Answer Sheet into responses.                         |
 |--------------------------------------------------------------*/ define  BIT_7     0x80
define  BIT_6     0x40
#define  BIT_5     0x20
#define  BIT_4     0x10
#define  BIT_3     0x08
#define  BIT_2     0x04
#define  BIT_1     0x02
define  BIT_0     0x01 define   LEFT_START_AREA              16
define   LEFT_TIME_MARK_WIDTH         128
#define   LEFT_TIME_MARK_WIDTH_IN_BYTES  16
#define   LEFT_THRESHOLD_SOLID_BYTES   3
define   LEFT_CONSIDER_BLANK_BITS     8
#define   LEFT_START_AREA              16
define   LEFT_TIME_MARK_WIDTH         128
#define   LEFT_TIME_MARK_WIDTH_IN_BYTES  16
#define   LEFT_THRESHOLD_SOLID_BYTES   3
define   LEFT_CONSIDER_BLANK_BITS     8 define   RIGHT_START_AREA             204
```

```
#define  RIGHT_TIME_MARK_WIDTH        180
#define  RIGHT_THRESHOLD_SOLID_BYTES  3
define  RIGHT_CONSIDER_BLANK_BITS    8 define  TOP_START_AREA               80
define  NO_TIMING_BOXES              60
#define  SPACE_BETWEEN_BOXES          8
#define  TIME_BOX_WIDTH_FOR_SCAN      15
define  TIME_BOX_REQUIRED_HEIGHT     9 define  CODED_BOX_WIDTH              36
define  CODED_BOX_PLUS_SPACE         74
#define  CODED_BOX_OFFSET             104    /* from center of timing mark to first coded box */
#define  CODED_BOX_WIDTH_IN_BYTES     7      /* round width in bytes */
#define  CODED_BOX_THRESHOLD          20     /* bits on to indicate box is checked */
#define  CODED_BOXES_ACCROSS          18     /* bits on to indicate box is checked */
define  CODED_BOX_WIDTH_IN_BITS      56 define  NO_ANSWERS                   250
define  NO_ANSWERS_PLUS_1            251 int i,key,video_flag,processed_first_fax,exit_code;
int first_bit_in_line,last_event_handle;
long base_memory_free,expanded_memory_free,vsize,case_location;
int image_depth,image_width,memory_to_use,gxtype,case_age,update_gb;
int raster_line_in_bytes,left_boxes,left_box_centers[NO_TIMING_BOXES],
left_box_height[NO_TIMING_BOXES],left_box_center_pixel
[NO_TIMING_BOXES];
int right_boxes,right_box_centers[NO_TIMING_BOXES],right_box_height
[NO_TIMING_BOXES],right_box_center_pixel[NO_TIMING_BOXES],
form_layout;
int adj_left_start_byte[NO_TIMING_BOXES];
int adj_right_start_byte[NO_TIMING_BOXES];
char bit_display[9],eol[2],ssn_number[10],zipcode[6],spouse_ssn_number[10],
primary_fax[30],last_dtek,last_beacon;
char responses[NO_TIMING_BOXES][18],answers[NO_ANSWERS_PLUS_1];
long int intrument_location,instrument_id,last_beacon_score;
long int last_form_id;

int left_bytes_to_scan,left_start_byte,orig_left_start_byte,orig_right_start_byte,
last_raster_read,raster_in_bytes,global_coded_box;
float box_plus_space;

char *raster_line_a;    /* pointer to raster line buffer */
char *raster_line_b;    /* pointer to raster line buffer */
char *pixel_line;       /* pointer to pixel line buffer */ decode_answers(pcx_filename)
  char *pcx_filename;
{
   int ret;
   left_boxes = 0; right_boxes = 0;

show_activity(16,0);
   ret = pcxGetFileHeader(pcx_filename,&pcxh);
   if (ret != pcxSUCCESS)
      { show_activity(17,1);
        show_string(pcx_filename);
        submit_bad_fax(3);
        return(-1);
      } if (gxEMInstalled() == gxSUCCESS)
      expanded_memory_free = gxVirtualFree(gxEMM);
   else
```

```
            expanded_memory_free = 0L;

image_width = (pcxh.x2 - pcxh.x1 + 1);
    image_depth = (pcxh.y2 - pcxh.y1 + 1);

base_memory_free = gxVirtualFree(gxCMM);
    memory_to_use = gxCMM;

gxtype = gxEGA_F;    /* force black and white mode */
    vsize = gxVirtualSize(gxtype,image_width,image_depth);
    if (vsize < base_memory_free)
        show_activity(18,0);
    else
        if (vsize < expanded_memory_free)
           { show_activity(19,0);
             memory_to_use = gxEMM;
           }
        else
           { show_activity(20,0);
             submit_bad_fax(1);
             return(-1);
           } video_flag = NO;
    if (gxtype == gxEGA_10) { video_flag = YES; gxtype = gxEGA_F; }
    /* bug in EGA video drivers */ ret = gxSetDisplay(gxtype);
    if (ret != pcxSUCCESS)
       { show_activity(27,1);
         return(-1);
       } ret = gxCreateVirtual(memory_to_use,&vheader,gxtype,image_width,image_depth);
    if (ret != pcxSUCCESS)
       { show_activity(28,1);
         return(-1);
       } ret = pcxFileVirtual(pcx_filename,&vheader,0,0);
    if (video_flag == YES)
       { gxtype = gxEGA_10;
         ret = gxSetDisplay(gxtype);
       }

/*-----------------------------------------------------------------*
 *  Scan first 300 scan lines in 1 inch left margins for amount    *
 *  of dark space.                                                 *
 *-----------------------------------------------------------------*/
    raster_in_bytes = image_width / 8;
    ret = locate_timing_marks();
    if (ret != 0) goto exit_with_errors;

/*-----------------------------------------------------------------*
 *  Locate center raster line for each pixel block.                *
 *-----------------------------------------------------------------*/
    ret = locate_center_pixels();

/*-----------------------------------------------------------------*
 *  For each pixel block scan for colored in boxes.                *
 *-----------------------------------------------------------------*/
    scan_coded_boxes();
}

/*-----------------------------------------------------------------
 |  Locate left and right hand side timing marks.                 |
```

```
|------------------------------------------------------------*/
locate_timing_marks()
{
  int scan_line,ret,left_skip_lines;
  int left_start_dark_block,left_end_dark_block,left_dark_block_height,
  left_dark_block_center;

int right_bytes_to_scan,right_start_byte,right_skip_lines;
  int right_start_dark_block,right_end_dark_block,right_dark_block_height,
  right_dark_block_center;

left_bytes_to_scan      = LEFT_TIME_MARK_WIDTH_IN_BYTES;
  left_start_byte         = LEFT_START_AREA / 8;

right_bytes_to_scan     = RIGHT_TIME_MARK_WIDTH / 8;
  right_start_byte        = (image_width - RIGHT_START_AREA) / 8;

ret = allocate_raster_buffer();
  if (ret < 0) return(-1);

ret = allocate_pixel_buffer();
  if (ret != 0) return(-1);

left_start_dark_block = 0;   left_skip_lines = 0;
  right_start_dark_block = 0;  right_skip_lines = 0;

sprintf(smessage,"Locate Timing marks.");
  show_string(smessage);

for (scan_line=TOP_START_AREA; scan_line <= image_depth; ++scan_line)
  { if (left_boxes == 44)
        { gxGetVirtualScanline(&vheader,scan_line,raster_line_a);
          goto check_right_line;   /* found all boxes on left side */
        } if (left_skip_lines > 0)
        { --left_skip_lines;
          gxGetVirtualScanline(&vheader,scan_line,raster_line_a);
          goto check_right_line;
        } gxGetVirtualScanline(&vheader,scan_line,raster_line_a);
/*------------------------------------------------------------
 |  Locate left hand side timing marks.                       |
 |-----------------------------------------------------------*/
     ret = raster_complete_bytes_count(left_start_byte,left_bytes_to_scan,1);

if (ret > LEFT_THRESHOLD_SOLID_BYTES)
        { if (left_start_dark_block == 0)
            {  orig_left_start_byte = left_start_byte;
               left_start_dark_block = scan_line;
               adj_left_start_byte[left_boxes] = left_start_byte;
            }
        }
     else
        { if (left_start_dark_block != 0)
            { left_end_dark_block = scan_line - 1;
              left_dark_block_height = left_end_dark_block -
              left_start_dark_block + 1;

if (left_dark_block_height <
              TIME_BOX_REQUIRED_HEIGHT) /* reset looking for dark
              block */
```

```
                    { left_start_dark_block = 0;
                      left_start_byte = orig_left_start_byte;
                      gxGetVirtualScanline(&vheader,scan_line,raster_line_a);
                      goto check_right_line;
                    } left_dark_block_center = left_dark_block_height / 2;
                left_dark_block_center = left_dark_block_center +
                left_start_dark_block;
                left_box_centers[left_boxes] = left_dark_block_center;
                left_box_height[left_boxes]  = left_dark_block_height;
                ++left_boxes;
                left_skip_lines = SPACE_BETWEEN_BOXES;
                left_start_dark_block = 0;
                ret = adjust_for_next_timing_box(left_dark_block_center,
                left_start_byte,left_bytes_to_scan);
                left_start_byte = left_start_byte + ret;
                gxGetVirtualScanline(&vheader,scan_line,raster_line_a);
              }
        } check_right_line:

if (right_boxes == 44) goto next_raster_line;   /* found all boxes on right
    side */
    if (right_skip_lines > 0)
        { --right_skip_lines;
          goto next_raster_line;
        }
/*------------------------------------------------------------------
|   Locate right hand side timing marks.                           |
|-----------------------------------------------------------------*/
    ret = raster_complete_bytes_count(right_start_byte,right_bytes_to_scan,
    0);

if (ret > RIGHT_THRESHOLD_SOLID_BYTES)
        { if (right_start_dark_block == 0)
            { orig_right_start_byte = right_start_byte;
              right_start_dark_block = scan_line;
              adj_right_start_byte[right_boxes] = right_start_byte;
            }
        }
    else
        { if (right_start_dark_block != 0)
            { right_end_dark_block = scan_line - 1;
              right_dark_block_height = right_end_dark_block -
              right_start_dark_block + 1;

if (right_dark_block_height < TIME_BOX_REQUIRED_
              HEIGHT) /* reset looking for dark block */
                 { right_start_dark_block = 0;
                   right_start_byte = orig_right_start_byte;
                   gxGetVirtualScanline(&vheader,scan_line,raster_line_a);
                   goto next_raster_line;
                 } right_dark_block_center = right_dark_block_height / 2;
              right_dark_block_center = right_dark_block_center +
              right_start_dark_block;
              right_box_centers[right_boxes] = right_dark_block_center;
              right_box_height[right_boxes]  = right_dark_block_height;
              ++right_boxes;
              right_skip_lines = SPACE_BETWEEN_BOXES;
              right_start_dark_block = 0;
              ret = adjust_for_right_timing_box(right_dark_block_center,
              right_start_byte,right_bytes_to_scan);
              right_start_byte = right_start_byte - ret;
```

```
            }
        } next_raster_line:;

} sprintf(smessage,"Timing Boxes Left %d  Right %d",left_boxes,right_boxes);
    show_string(smessage);
    if (left_boxes < 44 || right_boxes < 44)
        { submit_bad_fax(4);
          return(-1);
        } return(0);
}

/*-----------------------------------------------------------------
|    Adjust starting left margins if start of box has shifted.    |
|    This compensates for left shifting timing boxes.             |
 -----------------------------------------------------------------*/
adjust_for_next_timing_box(scan_line,start_byte,bytes_to_scan)
{ int bits_start,bits_end,bits_to_shift,bytes_to_shift,ret;

gxGetVirtualScanline(&vheader,scan_line,raster_line_a);
    ret = bytes_to_pixels(start_byte,bytes_to_scan);
    ret = find_block_bits(&bits_start,&bits_end);

if (first_bit_in_line == 0)
        { first_bit_in_line = bits_start;
          left_start_byte = (bits_start / 8) - 1 + left_start_byte;
          left_bytes_to_scan = TIME_BOX_WIDTH_FOR_SCAN;
          return(0);
        } if (first_bit_in_line < bits_start)
        { bits_to_shift = bits_start - first_bit_in_line;
          bytes_to_shift = bits_to_shift / 8;
          if (bytes_to_shift > 0)
             { first_bit_in_line = bits_start;
               return(bytes_to_shift);
             }
        } return(0);
}

/*-----------------------------------------------------------------
|    Adjust starting right margins. If first word checked is seton|
|    backup 1 byte.                                               |
 -----------------------------------------------------------------*/
adjust_for_right_timing_box(scan_line,start_byte,bytes_to_scan)
{
    char *p;
    unsigned char ubyte;
    int ret,bits;

gxGetVirtualScanline(&vheader,scan_line,raster_line_a);
    p = raster_line_a + start_byte;
    ubyte = *p;
    bits = bits_on(ubyte);
    if (bits > 1) return(1);
    else          return(0);
```

```
}
/*------------------------------------------------------------
 |  Locate center pixel in each timing mark box by using the  |
 |  center raster line.                                       |
 ------------------------------------------------------------*/ locate_center_pixels()
{
   int i,scan_line,ret;
   int bits_start,bits_end;

left_bytes_to_scan    = LEFT_TIME_MARK_WIDTH_IN_BYTES;
   left_start_byte       = LEFT_START_AREA / 8;

for (i=0;i<left_boxes;i++)
      { scan_line = left_box_centers[i];
        gxGetVirtualScanline(&vheader,scan_line,raster_line_a);
        ret = bytes_to_pixels(0,raster_in_bytes);

ret = find_left_block_bits(&bits_start,&bits_end);
        if (ret == 0) left_box_center_pixel[i] = ((bits_end - bits_start)
           / 2) + bits_start;
        else left_box_center_pixel[i] = 0;
      } for (i=0;i<left_boxes;i++)
      { scan_line = right_box_centers[i];
        gxGetVirtualScanline(&vheader,scan_line,raster_line_a);
        ret = bytes_to_pixels(0,raster_in_bytes);
        ret = find_right_block_bits(&bits_start,&bits_end);
        if (ret == 0) right_box_center_pixel[i] = ((bits_end - bits_start)
           / 2) + bits_start;
        else right_box_center_pixel[i] = 0;
      }
} find_block_bits(start_bit,end_bit)
   int *start_bit,*end_bit;
{
   int ret,bits_in_a_row;
   char *p;
   bits_in_a_row = 0; ret = -1;

p = pixel_line;

while (*p != '\0')
       { if (*p == '1') ++bits_in_a_row;
         else bits_in_a_row = 0;

if (bits_in_a_row == 3) {ret = (p - pixel_line - 1); break; }
         ++p;
       } if (ret == -1)   /* this is an error condition */
      { ret = 0;
      }
   *start_bit = ret;

ret = -1;
   bits_in_a_row = 0;
   while (*p != '\0')
       { if (*p == '0') ++bits_in_a_row;
         else bits_in_a_row = 0;

if (bits_in_a_row == 3) {ret = (p - pixel_line - 1); break; }
         ++p;
```

```
            } if (ret == -1)    /* cant find end of pixel line use original length */
        { ret = p - pixel_line - 1;
        }

*end_bit = ret;
    return(0);
} find_left_block_bits(start_bit,end_bit)
    int *start_bit,*end_bit;
{
    int ret,bits_in_a_row,i,j;
    char *p;
    bits_in_a_row = 0; ret = -1;

j = strlen(pixel_line);
    p = pixel_line; i = 0;

while (i < j)
        { if (p[i] == '1') ++bits_in_a_row;
          else bits_in_a_row = 0;
          if (bits_in_a_row == 10) {ret = i - 11; break; }
          ++i;
        } if (ret == -1)    /* this is an error condition */
        { ret = 0;
        }

*start_bit = ret;

ret = -1;
    bits_in_a_row = 0;
    while (i < j)
        { if (p[i] == '0') ++bits_in_a_row;
          else bits_in_a_row = 0;
          if (bits_in_a_row == 5) {ret = i - 6; break; }
          ++i;
        } if (ret == -1)    /* cant find end of pixel line use original length */
        { ret = *start_bit + 1;
        }

*end_bit = ret;
    return(0);
} find_right_block_bits(int *start_bit, int *end_bit)
{
    int ret,bits_in_a_row,i;
    char *p;
    bits_in_a_row = 0; ret = -1;
    i = strlen(pixel_line);
    p = pixel_line;

while (i >= 0)
        { if (p[i] == '1') ++bits_in_a_row;
          else bits_in_a_row = 0;
          if (bits_in_a_row == 10) {ret = (i + 10 - 1); break; }
          --i;
        } if (ret == -1)    /* this is an error condition */
```

```
      { ret = 0;
      }

*end_bit = ret;

ret = -1;            /* locate next 5 blank pixels */
   bits_in_a_row = 0;
   while (i >= 0)
         { if (p[i] == '0') ++bits_in_a_row;
           else bits_in_a_row = 0;
           if (bits_in_a_row == 5) {ret = (i + 5); break; }
           --i;
         } if (ret == -1)    /* cant find end of pixel line use original length */
       { ret = *end_bit - 2;
         printf(" Error.. finding left pixel box \n");
       }

*start_bit = ret;
   return(0);
} bytes_to_pixels(start_pos, count)     /* count dark bits on raster line */
   int start_pos,count;
{
  int i,ret;
  char *p,*p2;
  unsigned char ubyte;
/*  printf(" start pos %d count %d \n",start_pos,count); getch();  */
  p = raster_line_a + start_pos;
  p2 = pixel_line;

for (i=0;i<count; i++)
      { ubyte = *p++;
        display_byte(ubyte);
        *p2++ = bit_display[0];
        *p2++ = bit_display[1];
        *p2++ = bit_display[2];
        *p2++ = bit_display[3];
        *p2++ = bit_display[4];
        *p2++ = bit_display[5];
        *p2++ = bit_display[6];
        *p2++ = bit_display[7];
      }
  *p2 = '\0';

return(0);
} raster_complete_bytes_count(start_pos, count, print)    /* count dark bits on raster
line */
   int start_pos,count,print;
{
  int i,total_bytes,bits,ret;
  char *p;
  unsigned char ubyte;

total_bytes = 0;

p = raster_line_a + start_pos;
  for (i=0;i<count; i++)
      { ubyte = *p++;
        bits = bits_on(ubyte);
        if (bits == 8) ++total_bytes;
      }
  return(total_bytes);
}
```

```
bits_on(ubyte)
 unsigned char ubyte;
{
   int bits_turned_on;

bits_turned_on = 0;
   strcpy(display_bits,"XXXXXXXX");

if ( ubyte & BIT_7) { ++bits_turned_on; display_bits[0] = '.'; }
     if ( ubyte & BIT_6) { ++bits_turned_on; display_bits[1] = '.'; }
     if ( ubyte & BIT_5) { ++bits_turned_on; display_bits[2] = '.'; }
     if ( ubyte & BIT_4) { ++bits_turned_on; display_bits[3] = '.'; }
     if ( ubyte & BIT_3) { ++bits_turned_on; display_bits[4] = '.'; }
     if ( ubyte & BIT_2) { ++bits_turned_on; display_bits[5] = '.'; }
     if ( ubyte & BIT_1) { ++bits_turned_on; display_bits[6] = '.'; }
     if ( ubyte & BIT_0) { ++bits_turned_on; display_bits[7] = '.'; } bits_turned_on = 8 - bits_turned_on;
   return(bits_turned_on);
} allocate_raster_buffer()
{
  raster_line_in_bytes = (image_width / 8) + 32;
  raster_line_a = malloc(raster_line_in_bytes);
  if (raster_line_a == NULL)
     { show_activity(26,1);
       return(-1);
     }
  raster_line_b = malloc(raster_line_in_bytes);
  if (raster_line_b == NULL)
     { show_activity(26,1);
       return(-1);
     }
  return(0);
} allocate_pixel_buffer()
{
  pixel_line = malloc(image_width + 8);
  if (pixel_line == NULL)
     { show_activity(26,1);
       return(-1);
     }
  return(0);
}

/*-----------------------------------------------------------
|  For each timing block. Locate colored boxes along line.  |
-----------------------------------------------------------*/ scan_coded_boxes()
{
   int i,j,checked,ret;
   last_raster_read = -1;

sprintf(smessage,"Scanning for Dark Boxes.");
   show_string(smessage);
   for (i=0;i<left_boxes;i++)
       { ret = compute_box_plus_space(i);
         for (j=1;j<=CODED_BOXES_ACCROSS;j++)
            { checked = box_checked(i,j);
              if (checked > CODED_BOX_THRESHOLD) responses[i][j-1] = 'Y';
            }
       }
   sprintf(smessage,"Scanning Complete.");
   show_string(smessage);
```

```
/*      debugging code to look at one row of boxes at a time */
/*      for (j=1;j<=CODED_BOXES_ACCROSS;j++)
            { checked = box_checked(2,j);
              if (checked > CODED_BOX_THRESHOLD) responses[2][j-1] = 'Y';
            } */
} box_checked(timing_box,coded_box)
  int timing_box,coded_box;
{
    int delta_y,delta_x,xoffset,coded_box_center_raster_y,bitson,ret;
    float fdelta_y,fdelta_x,fslope,f_center_of_coded_box,f_xoffset;

/* forumula for line y = slope(x) + b   */ global_coded_box = coded_box-1;

delta_y = left_box_centers[timing_box] - right_box_centers[timing_box];
    delta_x = left_box_center_pixel[timing_box] - right_box_center_pixel
    [timing_box];
    fdelta_y = delta_y; fdelta_x = delta_x;
    fslope = fdelta_y / fdelta_x;

f_xoffset = global_coded_box;
    f_xoffset = f_xoffset * box_plus_space;
    xoffset = f_xoffset;
    xoffset = left_box_center_pixel[timing_box] + CODED_BOX_OFFSET + xoffset;
    f_xoffset = xoffset;

f_center_of_coded_box = (fslope * f_xoffset) + left_box_centers[timing_box];
    coded_box_center_raster_y = f_center_of_coded_box;

if (last_raster_read != coded_box_center_raster_y)
        { gxGetVirtualScanline(&vheader,coded_box_center_raster_y-2,raster_line_a);
          gxGetVirtualScanline(&vheader,coded_box_center_raster_y+2,raster_line_b);
          and_b_with_a(raster_in_bytes);
          ret = bytes_to_pixels(0,raster_in_bytes);
          last_raster_read = coded_box_center_raster_y;
        } bitson = find_total_bits_on(xoffset,xoffset+CODED_BOX_WIDTH_IN_BITS);
    return(bitson);
} compute_box_plus_space(int timing_box)
{
   int i;

i = (right_box_center_pixel[timing_box] - left_box_center_pixel[timing_box])
   - 180;
   box_plus_space = i;
   box_plus_space = box_plus_space / 18;
   return(0);
} and_b_with_a(int count)     /* count dark bits on raster line */
{
  int i,ret;
  char *p1,*p2;

p1 = raster_line_a;
  p2 = raster_line_b;

for (i=0;i<count; i++)
      { *p1 = *p1 & *p2;
        ++p1;
```

```
        ++p2;
    }
    return(0);
}

/*----------------------------------------------------------------
  | New method counts a bit if the bit to the right of it is on |
  ----------------------------------------------------------------*/ find_total_bits_on(int start_bit,int end_bit)
{
    int ret,bits_in_a_row,i,j,max_found;
    char *p;

p = pixel_line;
    bits_in_a_row = 0;
    for (i=start_bit; i<=end_bit; i++)
        { if (p[i] == '1' && p[i+1] == '1') ++bits_in_a_row;
        } return(bits_in_a_row);
}
```

What is claimed is:

1. A method for the real-time automatic determination of the approval status of a potential borrower for a loan, comprising the steps of:
   a) transmitting an image of a form by facsimile transmission to a control location wherein said form contains predefined information applicable to said potential borrower, including the identity of the potential borrower, in spaces located at predetermined locations;
   b) automatically receiving said image of said form by facsimile transmission at said control location;
   c) automatically scanning and interpreting the image of said form to obtain said predefined information;
   d) automatically determining at said control location said approval status of said potential borrower according to criteria provided by a lender, wherein said determining step utilizes said predefined information; and
   e) automatically transmitting information regarding said approval status from said control location to said potential borrower.

2. The method of claim 1, wherein said predefined information identifies said potential borrower, further comprising the steps of:
   a) prior to said determining step, automatically transmitting said predefined information identifying said potential borrower to a data processing system maintained by a credit bureau;
   b) automatically selecting stored financial information regarding said potential borrower from a data file of said stored financial information located in said data processing system;
   c) automatically transmitting said selected stored financial information regarding said potential borrower from said data processing system to said control location; and
   d) automatically utilizing said selected stored financial information in said determining step.

3. The method of claim 1, wherein said step of automatically transmitting information regarding said approval status comprises automatically creating an image of said information and transmitting said image of said information to said potential borrower by facsimile transmission.

4. The method of claim 1, wherein said form comprises a rectangular or square sheet having a predetermined number of timing marks, each having a vertical center, spaced at predetermined intervals along the right hand and left hand vertical borders of said sheet such that each timing mark along said left hand border is paired with one timing mark along said right hand border and wherein said automatic scanning and interpretation step comprises:
   a) automatically scanning said form to ascertain presence and location of said predetermined number of timing marks;
   b) automatically locating the vertical center of each timing mark;
   c) automatically locating a line between the vertical center of each left hand timing mark to said vertical center of said paired right hand timing mark;
   d) automatically detecting said spaces in predetermined locations along each line; and
   e) automatically obtaining said predefined information applicable to said potential borrower from said spaces.

5. The method of claim 1, further comprising the step of automatically transmitting said information regarding said approval status to said lender.

6. The method of claim 1, further comprising the step of automatically transmitting information regarding the identity of said potential borrower to a predetermined lead organization.

7. The method of claim 1, wherein said loan is selected from the group consisting of a real estate mortgage loan, a refinancing loan, an automobile loan, a personal revolving debt loan and a general loan.

8. The method of claim 1, further comprising the step of updating said criteria provided by said lender.

9. The method of claim 1, further comprising the step of transmitting current interest rates of said lender from said control location to a remote location.

10. A system, for the real-time automatic determination of the approval status of a potential borrower for a loan, said system comprising:
   a) a programmed data processor;
   b) a form comprising spaces in predetermined locations, wherein said spaces are associated with predefined information applicable to said potential borrower;

c) first facsimile transmission means for transmitting an image of said form to a control location;

d) first facsimile receiving means at said control location associated with said data processor for receiving the image of said form;

e) scanning and interpretation means associated with said data processor for automatically reading the image of said form and storing said predefined information applicable to said potential borrower;

f) determining means associated with said data processor for automatically determining said approval status of said potential borrower according to criteria provided by a lender, wherein said determining means utilizes said predefined information; and g) means associated with said data processor at said control location for automatically transmitting information regarding said approval status to said potential borrower.

11. The system of claim 10, wherein said predefined information identifies the potential borrower, further comprising:

a) data communication processing means associated with said data processor for automatically transmitting said information identifying said potential borrower to a credit bureau data processing system;

b) means associated with said credit bureau data processing system for selecting stored financial information regarding said identified potential borrower from a data file of said stored financial information;

c) data communication means for transmitting said selected stored financial information regarding said identified potential borrower to said data processor at said control location; and d) means for automatically utilizing said selected stored financial information in the determination of said approval status of said potential borrower.

12. The system of claim 10, wherein said means for transmitting information regarding said approval status to said potential borrower comprises:

a) second facsimile transmission means at said control location;

b) means associated with said data processor for creating an image of said information and transmitting said image of said information to said potential borrower by said second facsimile transmission means; and c) second facsimile receiving means for receiving said image of said information.

13. The system of claim 10, wherein said form comprises a rectangular or square sheet having a predetermined number of timing marks spaced at predetermined intervals along the right hand and left hand vertical borders of said sheet such that each timing mark along said left hand border is paired with one timing mark along said right hand border and wherein said scanning and interpretation means comprise:

a) scanning means for scanning said form to ascertain the presence and location of said predetermined number of timing marks;

b) locating means for locating the vertical center of each timing mark and for locating a line between said vertical center of each left hand timing mark to said vertical center of the respective paired right hand timing mark;

c) detecting means for detecting said spaces in predetermined locations along each line; and d) obtaining means for obtaining said predefined information applicable to said potential borrower from said spaces.

14. The system of claim 10, further comprising means for automatically transmitting said information regarding said approval status to said lender.

15. The system of claim 10, further comprising means for transmitting information regarding the identify of said potential borrower to a predetermined lead organization.

16. The system of claim 10, further comprising means for transmitting current interest rates of said lender from said control location to a remote location.

* * * * *